United States Patent Office 3,632,670
Patented Jan. 4, 1972

3,632,670
PROCESS FOR MODIFYING POLYMERS
Yoshisato Fujisaki, Tokyo, Itsuho Aishima, Nobeoka, Miyazaki, Hisaya Sakurai, Kawasaki, Kanagawa, Atsushi Kitaoka, Asahi-machi, Miyazaki, and Hironobu Kawasaki and Minoru Oshima, Nobeoka, Miyazaki, Japan, assignors to Asashi Kasei Koygo Kabushiki Kaisha, Osaka, Japan
No Drawing. Filed July 25, 1967, Ser. No. 655,742
Claims priority, application Japan, Aug. 5, 1966,
41/51,474
Int. Cl. C08f 15/00
U.S. Cl. 260—875
1 Claim

ABSTRACT OF THE DISCLOSURE

Process for modifying polymers which comprises reacting mono-olefin polymer with polymerizable monomer by heating them in the presence of tetravalent organotin compound.

BACKGROUND OF THE INVENTION (1) Field of the invention

This invention relates to a process for producing modified polymers having improved properties, and more particularly, it relates to a process for producing such modified polymers which comprises reacting mono-olefin polymer with polymerizable monomer by heating them in the presence of tetravalent organotin compound.

(2) Description of the prior art

Although various mono-olefin polymers having specific properties useful as high molecular polymers have been known heretofore, these mono-olefin polymers as the raw materials in the various fields are required to have still higher standard of performance and combination of excellent properties as the development in the industry as a whole has made great strides. In order to meet such growing demands, there have been proposed a number of methods of modifying mono-olefin polymers.

Many of these methods of modifying polymers known heretofore may be generally classified into two groups, i.e. one of them being methods involving blending of various high or low molecular weight materials with polymers to be modified, and the other involving chemical reactions, particularly, copolymerization of different type of monomers with the base polymers to be modified.

The fundamental requisites for a practical and desirable method of modifying polymers are (1) to modify the contemplated characteristics to give a product having desirable properties, (2) to cause little or no important deterioration of desirable properties originally belonging to polymers to be modified, and (3) to be practised on a commercial scale easily and inexpensively. So far, these requisites have not been satisfied by the prior art methods known heretofore.

For example, it is well known that crystalline propylene polymers as a material for the production of plastics, films and fibers have drawbacks in that they have very low impact strength; that they have poor affinity with dyes; that they are susceptible to light degradation, etc. In order to improve the impact strength of propylene polymer, there have been proposed various methods of blending synthetic rubber with crystalline propylene polymer. However, if synthetic rubber is blended with propylene polymer in a sufficient amount to improve the impact strength of the propylene polymer to a practical extent, there is inevitably accompanied by a disadvantage in that the inherent desirable properties of crystalline propylene polymer such as the high levels of hardness, softening temperature, tensile strength, modulus of elasticity, etc. are degraded. Also, there have been attempted to improve the dyeability fo crystalline propylene polymer by blending some polar compounds therewith. However, these methods involving blending of other additives have been usually encountered with difficulties such as phase separation, bleeding at the time of dying, etc., which are stemmed from the poor compatibility of the additives with the base polymers. The incorporation of light stabilizer also presents a serious problem of bleeding.

As noted above, while the method of blending additives to modify the polymers may be practised relatively easily, it has many disadvantages attributable to the absence of chemical linkage between the polymers and the additives employed.

These inconveniences are fairly avoided by the copolymerization or other ways of modification which involve the chemical reactions.

For example, the impact strength of crystalline propylene polymers can be successfully improved by block copolymerization of a minor proportion of ethylene or ethylene propylene with little or no important decreases in the rigidity and modulus of elasticity which are the desirable characteristics of propylene polymer.

The problems of incompatibility and bleeding of additives added in order to improve dyeability of crystalline propylene polymer may also be eliminated by subjecting the crystalline propylene polymer or shaped articles thereof to a peroxidation, or graft copolymerization of monomers containing polar group thereon under an irradiation of various radiations.

However, if the mono-olefin polymers are to be modified to such an extent that they afford practical satisfaction in accordance with the methods proposed heretofore, it would involve complications in the operation and inevitably lead to a higher production cost of these modified polymers.

SUMMARY OF THE INVENTION

It is, therefore, an object of this invention to provide a process for the production of modified mono-olefin polymers having improved impact strength, hardness, heat resistance and dyeability.

It is another object of this invention to provide such process which can be practised easily on a commercial scale, overcoming inconveniences accompanied by the prior art processes known heretofore, and without sacrificing the desirable properties inherent in the base polymers.

It has now been found that the objects of this invention mentioned above can be accomplished by the process of this invention which comprises reacting mono-olefin polymers with polymerizable monomer by heating them in the presence of tetravalent organotin compound.

Mono-olefin polymers referred to herein include homopolymers of mono-olefins such as ethylene, propylene, butene-1, 3-methylbutene-1, 4-methylpentene-1 and styrene; copolymers or block polymers of the above-mentioned mono-olefin monomers with the other monomers; and mixtures of two or more kinds of mono-olefin homopolymers or copolymers.

While any tertavalent organotin compounds may be conveniently used in the process of this invention, typical examples thereof include compounds of the general formulae:

$[R]_1Sn[OOCR']_m$ or $R'COO[Sn(R)_2O]_nOCR'$

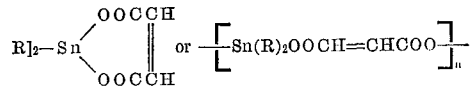

$[R]_2SnO$ or $[\text{—}Sn(R)_2O\text{—}]_n$
$[R]_1Sn[OOC \cdot CH=CHCOOR']_m$
$[R]_1Sn[OR']_m$ or $R'O[Sn(R)_2O\text{—}]_nR'$ R'O[Sn(R)₂O]ₙOCR'
R'O[Sn(R)₂O]ₙOC·CH=CHCOOR'
R[Sn(R)₂O]ₙSn[R]₃
[R'O]₁Sn[R]ₘ[OOCR']ₛ
[R]₃SnOH
[R'O]₁Sn[R]ₘ[SR']ₛ
[R]₂SnS or [—Sn(R)₂S—]ₙ
[R]₁Sn[SR]ₘ, and
[R]₁Sn[X]ₘ wherein R which may be the same or different represents alkyl, allyl, aryl such as phenyl, tolyl and naphthyl, benzyl or cyclohexyl groups; R' which may be the same or different represents alkyl, aryl or cycloalkyl groups which may contain substituent, X represents halogen; $l$ and $m$ represent integers of 1, 2 or 3; $s$ represents integers of 0, 1 or 2; $l+m+s$ makes 4; and $n$ represents a degree of polymerization.

Polymerizable monomers which may be used in the process of this invention as modifier include styrene or derivatives thereof such as α-methylstyrene, and o-methylstyrene; acrylic acid, methacrylic acid or esters, amides or metal salts thereof such as methyl acrylate, butyl acrylate, lauryl acrylate, stearyl acrylate, acrylic amide, sodium acrylate, calcium acrylate, methyl methacrylate, butyl methacrylate, lauryl methacrylate, cyclohexyl methacrylate, glycidyl methacrylate, methacrylic amide, sodium methacrylate, and calcium methacrylate; vinyl esters or allyl esters such as vinyl butyrate, vinyl laurate, vinyl stearate, vinyl adipate, allyl acetate, and allyl laurylate; polycyclic and heterocyclic vinyl compounds such as vinyl naphthalene, N-vinylcarbazole, vinylpyridine and vinylpyrrolidone; mono-functional monomers such as acrylonitrile, methacrylonitrile and vinyl ketone; and poly-functional monomers such as divinylbenzene, ethylene dimethacrylate, diethylene dimethacrylate, polyethylene dimethacrylate, divinyladipate, diallyl maleate, diallyl phthalate, allyl acrylate, triallylphosphite, diallylcyanurate and triallylcyanurate.

These monomers as exemplified above may be used as a mixture of two or more kinds depending upon the purpose contemplated.

We have found that the aforementioned organotin compounds have a powerful ability in lowering the molecular weight of α-olefin polymers at a high temperature, e.g. 210–350° C., and completed the process for improving processability of α-olefin polymers of this invention on the basis of such a finding.

Our further study of the process mentioned above have led to a surprising finding that the tetravalent organotin compounds are useful as catalysts in the chemical modification of these mono-olefin polymers by polymerizable monomer, and the process of this invention has its basis on such a novel finding.

More specifically, we have found that the mere mixing of polymerizable monomers with mono-olefin polymers and subsequent heating of the resulting mixture lead to very little or no reaction of these reactants and it is completely unsatisfactory in modifying mono-olefin polymers practically, whereas a remarkable reaction takes place in a very short period of time if these reactants are heated in the presence of the tetravalent organotin compounds.

The reaction referred to herein implies that mono-olefin polymers are brought into contact with polymerizable monomers in the presence of organotin compounds to form linkage between mono-olefin polymers and polymerizable monomers.

Modified polymers obtained according to the process of this invention may contain unreacted monomers and/or homopolymers thereof which are not linked to mono-olefin polymers. Although these unlinked or unreacted monomers or homopolymers thereof may be removed from the modified polymers if required, it is not necessary in most cases. The reason is that the product obtained according to the present process comprising the modified polymer and these unreacted monomers or homopolymers shows an excellent behavior than that of a simple blended polymer comprising unmodified polymer and unreacted monomers or homopolymers thereof. In general, the use of a higher proportion of organotin compounds is effective in increasing the amount of linkage of modifiers, i.e. polymerizable monomers with the base polymers.

The process of this invention may improve various properties of mono-olefin polymers and particularly, there are brought about the improvements in the impact strength, hardness, modulus of elasticity, heat distortion temperature, affinity with dyes, transparency, and compatibility with other additives.

In attempts to improve the impact strength of a polymer by conventional methods, there is encountered an incompatible problem in which the improvement in the impact strength leads to decreases in the rigidity and the modulus of elasticity as observed in the blending of synthetic rubber with the polymer, and the improvements in the rigidity and the modulus of elasticity give rise to a deterioration in the impact strength as observed in the blending of inorganic substances with the polymer. It is, however, desirable for the practical purpose that a balanced improvement may be achieved in all of these important properties, i.e. the rigidity, the modulus of elasticity and the impact strength.

It has been unexpectedly found that when the mono-olefin polymers are modified according to the process of this invention by using monomers such as ethylene dimethacrylate, polyethylene dimethacrylate, divinyladipate, diallylmaleate; allyl acrylate and glycidyl methacrylate, not only the impact strength but also the rigidity and the modulus of elasticity can be improved.

If it is desirable to improve particularly the impact strength to a great extent, the use of monomers containing long chain alkyl groups such as stearyl acrylate, lauryl methacrylate, stearyl methacrylate, vinyllaurylate, allyl laurylate and allyl stearate is effective.

The dyeability of a mono-olefin polymer can be improved by using polymerizable monomers containing polar group such as methacrylic acid, sodium acrylate, sodium methacrylate, methyl methacrylate and 2-vinylpyridine.

As described above, the type and amount of monomers used in the process of this invention depend upon the purpose of modification contemplated.

Monomers used in the process of this invention may be in any forms of solid, liquid or gas at a reaction temperature of 200–350° C.

Although the amounts of organotin compound and polymerizable monomer used in the process of this invention varies depending upon the reaction conditions employed and the purpose of modification contemplated, in general, organotin compound of from 0.01 to 10% by weight, and monomer of from 0.1 to 50% by weight based on the weight of the mono-olefin polymer are preferably used.

The reaction temperature in the process of this invention also varies depending upon the types of polymers to be modified and of organotin compound used. However, in general, a temperature of from 200° to 350° C., and most preferably from 210° to 320° C., is used. At temperatures below 200° C., the effect of organotin compound is unexpectable, and at temperatures exceeding 350° C., the adjustment of the reaction becomes very difficult due to a high reaction rate.

Although the reaction period required in the process of this invention varies somewhat depending upon the type of starting polymer, the type of organotin compound and monomer used in the reaction, and the reaction conditions such as the temperature used, normally, a reaction time of from several minutes to 10 and some odd minutes should be sufficient since the reaction is proceeded very quickly. This requirement for a very short reaction time facilitates easy working of the process of this invention on a commercial scale as described hereinafter.

As noted above, organotin compounds used in the process of this invention also have a powerful ability in lowering the molecular weight of α-olefin polymers at a high temperature of 210–350° C. Therefore, in accordance with this invention the improvement in the processability of a polymer which is difficulty processed due to its high molecular weight as well as the modifications of the properties may be accomplished successfully. More practically, the molecular weight control and the modifications of a polymer may be accomplished simultaneously by reacting the starting polymer with monomer by heating them in the presence of tetravalent organotin compound. Alternatively, the molecular weight control may be effected first by heating the starting polymer in the presence of organotin compound, immediately followed by contacting with the monomer to achieve the modification in the properties.

In practising the process of this invention, equipments such as closed agitatable autoclave, mixing rolls, kneader, Banbury mixer and screw extruder may be conveniently used. In view of the fact that the reaction in the process of this invention requires very short period of time, the simplest and most advantageous way of working the process of this invention on a commercial scale is to use a screw extruder-type pelletizing apparatus with which the modification of the starting polymer and the pelletizing of the resulting modified polymer can be accomplished at the same time. The screw extruder-type pelletizing apparatus used in the pelletizing process in the production of resins normally requires an extruding time of from several minutes to ten and some odd minutes which corresponds to a heating time required in the present process.

As described above, in accordance with the process of this invention, polymers may be simultaneously pelletized and modified, and no particular equipment for the present modifying process is required, thus, it can be worked quite easily on a commercial scale.

The process of this invention may be carried out in the presence of pigments, plasticizers and various heat and light stabilizers without causing any inconvenience. However, it is more desirable that the suitable type and amount of stabilizers such as heat stabilizers and light stabilizers may be incorporated into the modified polymer after the completion of the chemical modification according to the process of this invention, depending upon the purpose.

DESCRIPTION OF THE PREFERRED EMBODIMENTS

The following examples will serve to illustrate this invention more fully and practically.

It should not be construed, however, that these examples restrict this invention as they are given merely by way of illustration.

In the examples, the impact strength, tensile modulus, hardness, tensile strength and heat distortion temperature of the modified polymers were measured and evaluated on the following basis:

The test pieces were prepared by compress molding the modified polymers obtained in the examples in accordance with the method described in ASTM–D638–61T, and these test pieces were conditioned for 72 hours before measuring the following physical properties according to ASTM Standard:

Izod impact strength:
    ASTM D256–56 Unit ft.-lb./inch (notched)
Tensile modulus:
    ASTM D638–61T Unit kg./mm.$^2$
    (Cross head speed 0.2 in./min.)
Rockwell hardness:
    ASTM D785–51 Unit R scale
Tensile yield strength:
    ASTM D638–61T Unit kg./cm.$^2$
    (Cross head speed 2 in./min.)
Heat distortion temperature:
    ASTM D648–58T Unit ° C.
    (Fiber stress 66 p.s.i.)

EXAMPLES 1–5

To a powdered propylene polymer having an intrinsic viscosity of 4.3 and 99.5% of a portion insoluble in boiling n-heptane were incorporated various amounts of dibenzyl-tin-oxide and n-butyl methacrylate as specified in the following Table 1. The resulting mixture was put into a hopper of a screw extruder of 40 mm. diameter which was flushed with nitrogen, kneaded in a molten state at 250° C. and extruded to give a modified polymer.

The resultant polymer was treated with acetone which is a non-solvent to the crystalline propylene polymer but a good solvent to n-butyl methacrylate monomer and homopolymer thereof, and xylene which is a good solvent to both crystalline propylene polymer and n-butyl methacrylate monomer and homopolymer thereof while hot. More specifically, the resultant polymer was dissolved in 100 cc. of hot xylene per 1.0 g. of the resultant polymer and the resulting solution was poured into a large amount of acetone to give precipitates. After repeating the procedures twice, the portion insoluble in acetone was collected and further boiled in acetone thereby removing unreacted n-butyl methacrylate monomer which was not linked to the crystalline propylene polymer and homopolymer thereof. The resulting modified polymer was subjected to an infrared spectrography to determine the amount of n-butyl methacrylate linked to propylene polymer as shown in the Table 1. It was confirmed that n-butyl methacrylate monomer and homopolymer thereof can be completely separated from the reaction mixture comprising crystalline polymer, n-butyl methacrylate monomer and homopolymer thereof by the operation mentioned above, and that the content of n-butyl methacrylate linked to the crystalline propylene polymer determined by the above-mentioned method remained constant even after repeating the separation procedures.

For comparison, the experiments were repeated without using dibenzyl-tin-oxide and the results are shown as comparative examples in Table 1.

TABLE 1

| | Amounts of catalyst and modifier [1] (percent) | | n-Butyl methacrylate found in the modified polymer after repeating operation (percent) |
|---|---|---|---|
| | Dibenzyl-tin-oxide | n-Butyl methacrylate | |
| Comparative Example No.: | | | |
| 1 | | 2.0 | 0.0 |
| 2 | | 5.0 | 0.0 |
| Example No.: | | | |
| 1 | 0.5 | 5.0 | 2.1 |
| 2 | 1.0 | 5.0 | 2.6 |
| 3 | 2.0 | 5.0 | 3.2 |
| 4 | 0.5 | 2.0 | 1.4 |
| 5 | 0.5 | 10.0 | 4.2 |

[1] By weight based on the weight of propylene polymer.

In the comparative Examples 1 and 2 shown above, no dibenzyl-tin-oxide was used and a mixture obtained by simply mixing propylene polymer and n-butyl methacrylate was subjected to the above-mentioned operations including melting, kneading, extruding and separating procedures. The results show that n-butyl methacrylate was completely removed from propylene polymer. On the other hand, the results obtained in Examples 1–5 using dibenzyl-tin-oxide according to the process of this invention show that 40–60% of n-butyl methacrylate charged was linked to propylene polymer. It is clear that the presence of dibenzyl-tin-oxide served effectively in the reaction of propylene with n-butyl methacrylate.

The resulting modified polymer was subjected to an alkali-hydrolysis and formed into filaments and the resulting filaments were dyed by using disperse dyes and basic dyes.

The filaments obtained in Examples 1–5 according to the process of this invention showed medium and high dyeabilities, whereas the filaments obtained in Comparative Examples 1 and 2 were only smeared by the dyes, and the inherent dyeability of propylene polymer was not improved at all.

EXAMPLES 6-9

To a powdered propylene polymer having an intrinsic viscosity of 14.2 and 98% of a portion insoluble in boiling n-heptane were incorporated various amounts of dibenzyl-tin-oxide and ethylene dimethacrylate as specified in the following Table 2. The resulting mixture was put into a hopper of a 40 m./m. diameter screw extruder-type pelletizing device which was flushed with nitrogen, and kneaded in a molten state at 240° C., and extruded to give a modified polymer.

For comparison, the various mixtures containing ethylene dimethacrylate or dibenzyl-tin-oxide respectively alone, and containing neither modifier nor catalyst at all were extruded under the same conditions. As a result, the mixtures containing neither modifier nor catalyst, and ethylene dimethacrylate alone were not extrudable due to their too high melt viscosities. Thus, in these comparative examples, test pieces were prepared from a polymer having 98% of a portion insoluble in boiling n-heptane, of which intrinsic viscosity was adjusted at 2.0 beforehand, instead of the polymer having an intrinsic viscosity of 14.2.

The physical properties of the modified polymers were measured and the results are given in the following Table 2:

TABLE 2

| | Amounts of catalyst and modifier used [1] (percent) | | Melt index 230° C. 2.16 kg. | Mechanical properties | | | |
|---|---|---|---|---|---|---|---|
| | Dibenzyl-tin-oxide | Ethylene dimeth-acrylate | | Tensile yield strength | Tensile modulus | Rockwell hardness | Izod impact strength |
| Comparative Example No.: | | | | | | | |
| 3 | | | 5 | 320 | 119 | 84 | 0.30 |
| 4 | 0.5 | | 7 | 321 | 120 | 84 | 0.32 |
| 5 | 1.0 | | 8 | 320 | 118 | 83 | 0.32 |
| 6 | | 2.0 | 6 | 317 | 116 | 82 | 0.34 |
| 7 | | 5.0 | 7 | 310 | 109 | 78 | 0.39 |
| Example No.: | | | | | | | |
| 6 | 0.5 | 2.0 | 6 | 319 | 125 | 91 | 0.45 |
| 7 | 0.5 | 5.0 | 5 | 318 | 123 | 88 | 0.55 |
| 8 | 1.0 | 2.0 | 7 | 320 | 132 | 92 | 0.50 |
| 9 | 1.0 | 5.0 | 6 | 319 | 128 | 87 | 0.57 |

[1] By weight based on the weight of propylene polymer.

Upon comparing the results obtained in Comparative Examples 3–5 with those of Comparative Examples 6–7, it can be noted that the addition of 2–5% by weight of ethylene dimethacrylate based on the weight of propylene polymer improves the impact strength by 10–30%, but on the other hand, it degrades the tensile strength, tensile modulus and hardness which are the desirable properties of original propylene polymer.

In contrast therewith, in Examples 6–9 according to the process of this invention, it is clearly noted that the use of dibenzyl-tin-oxide in addition to the same amount of ethylene dimethyacrylate as in Comparative Examples 6 and 7 afforded the modified polymers having well-balanced mechanical properties including the impact strength increased by 50–100%, the improved tensile modulus and hardness. Judging from the fact that the polymer having such excellent properties cannot be obtained by incorporating ethylene dimethacrylate alone to the crystalline propylene polymer, the effect of dibenzyl-tin-oxide is quite clear.

The solubilities of polymers obtained in these comparative examples and examples in hot xylene were examined. As a result, it was revealed that all of the polymers obtained in Comparative Examples 3–7 were dissolved completely therein, in spite of the fact that the modified polymers obtained in Examples 6–9 according to the process of this invention showed the presence of insoluble portions. This clearly indicates the occurrence of chemical reactions between the crystalline propylene polymers and ethylene dimethacrylate.

EXAMPLES 10-14

To a powdered propylene polymer having an intrinsic viscosity of 6.8 and 97% of a portion insoluble in boiling n-heptane were incorporated various amounts of dibenzyl-tin-methoxide and various types and amounts of monomers as specified in the following Table 3 and the reactions were carried out under the same conditions as in Examples 6–9 described hereinbefore. The mechanical properties of the resulting modified polymers are given in the following Table 3. The test pieces were prepared according to the same procedures as in Examples 6–9:

TABLE 3

| | Amounts of catalyst and modifier used [1] (percent) | | | Melt index 230° C., 2.16 kg. | Mechanical properties | | | |
|---|---|---|---|---|---|---|---|---|
| | Dibenzyl-tin-meth-oxide | Type of monomers | Amount | | Tensile yield strength | Tensile modulus | Rockwell hardness | Izod impact strength |
| Comparative Example No.: | | | | | | | | |
| 8 | 1.0 | | | 12 | 325 | 121 | 84 | 0.23 |
| 9 | | Lauryl methacrylate | 5.0 | 9 | 306 | 105 | 74 | 0.42 |
| 10 | | Allyl stearate | 5.0 | 10 | 307 | 107 | 73 | 0.43 |
| 11 | | Vinyl laurate | 5.0 | 7 | 305 | 100 | 69 | 0.44 |
| Example No.: | | | | | | | | |
| 10 | 0.5 | Lauryl methacrylate | 5.0 | 10 | 313 | 113 | 79 | 0.60 |
| 11 | 1.0 | do | 5.0 | 11 | 318 | 116 | 80 | 0.65 |
| 12 | 1.0 | do | 10.0 | 3 | 307 | 109 | 76 | 0.73 |
| 13 | 1.0 | Allyl stearate | 5.0 | 11 | 316 | 110 | 77 | 0.67 |
| 14 | 1.0 | Vinyl stearate | 5.0 | 7 | 312 | 109 | 75 | 0.71 |

[1] By weight based on the weight of propylene.

After the polymers obtained in Comparative Example 9 and Examples 10 and 11 were treated according to the same procedures as described in Examples 1–5, the amounts of monomers linked to the crystalline propylene polymer were determined. As a result, no lauryl methacrylate linked to the propylene polymer was observed in the polymer obtained in Comparative Example 9, whereas the presence of 2.3% and 3.8% by weight of monomers linked to propylene polymer based on the weight of propylene polymer was observed in the polymers obtained in Examples 10 and 11, respectively.

As can be noted from the Comparative Examples 8-11 shown in Table 3, the additions of 5% by weight of lauryl methacrylate, allyl stearate and vinyl laurate, respectively alone, based on the weight of propylene polymer increase the impact strength of the propylene polymer by 50-60%, while the tensile modulus and hardness are decreased by 10-20%.

In contrast therewith, the impact strength of the modified polymers obtained in Examples 10-14 are increased by more than 200%, while the changes in the tensile modulus and hardness remains less than 10%, thus, it can be noted that the polymers are modified quite advantageously

EXAMPLES 15-16

To a powdered high bulk density polyethylene having a specific gravity of 0.95 were incorporated various amounts of di-tert-butyltin oxide and divinyl-benzene having a purity of 55% as specified in the following Table 4, and the resulting mixtures were put into a 200 cc. capacity kneader and milled for 10 minutes at 240° C. under nitrogen atmosphere. The rotation of the screws was adjusted so that one of the screws was rotated at 40 r.p.m., and the other at 60 r.p.m.

The mechanical properties of the resulting modified polymers were measured and the results are shown in the following Table 4:

TABLE 4

| | Amounts of catalyst and modifier used[1] (percent) | | Melt index 190° C., 2.16 kg. | Mechanical properties | | |
|---|---|---|---|---|---|---|
| | Di-tert-butyltin-oxide | Divinyl-benzene | | Tensile yield strength | Tensile modulus | Rockwell hardness |
| Comparative Example No.: | | | | | | |
| 12 | | | 3.0 | 223 | 74 | 33 |
| 13 | 0.5 | | 3.2 | 226 | 78 | 35 |
| 14 | | 0.5 | 3.0 | 218 | 68 | 30 |
| Example No.: | | | | | | |
| 15 | 0.5 | 5.0 | 2.5 | 238 | 81 | 41 |
| 16 | 1.0 | 5.0 | 2.7 | 231 | 84 | 43 |

[1] By weight based on the weight of polyethylene.

In examples 15 and 16, some increase in the torque were observed in the course of milling in the kneader.

It is understood from the results shown in Table 4 that the mechanical properties of the modified polymers obtained according to the process of this invention are remarkably improved as compared with those of polymers obtained under the same conditions by using neither modifier nor catalyst at all, or by using either di-tert-butyltin oxide or divinylbenzene, respectively alone.

EXAMPLES 17-19

To a powdered ethylene propylene copolymer containing 4.2 mol percent of ethylene, having an intrinsic viscosity of 3.2 and 92.1% of a portion insoluble in boiling n-heptane were incorporated various amounts of dibenzyltin-dimethoxide and styrene as specified in the following Table 5 and the resulting mixtures were put into a hopper of a 40 m./m. diameter screw extruder-type pelletizing device which was flushed with nitrogen, and the mixture was kneaded in a molten state at 240° C. and extruded to give the modified polymers.

For comparison, polymers containing no modifier at all and containing dibenzyl-tin-dimethoxide or styrene, respectively alone, were also extruded under the same conditions.

The mechanical properties of the resulting modified polymers and the comparative polymers were measured as shown in the following Table 5:

TABLE 5

| | Amounts of catalyst and modifiers [1] (percent) | | Melt index 230° C., 2.16 kg. | Mechanical properties | | | |
|---|---|---|---|---|---|---|---|
| | Dibenzyl-tin-di-methoxide | Styrene | | Tensile yield strength | Tensile modulus | Rockwell hardness | Izod impact strength |
| Comparative Example No.: | | | | | | | |
| 15 | | | 1.3 | 319 | 110 | 80 | 0.37 |
| 16 | 0.5 | | 6.3 | 320 | 113 | 82 | 0.32 |
| 17 | | 5.0 | 3.1 | 310 | 109 | 77 | 0.33 |
| Example No.: | | | | | | | |
| 17 | 0.5 | 5.0 | 4.0 | 310 | 121 | 83 | 0.51 |
| 18 | 1.0 | 10 | 2.8 | 308 | 129 | 88 | 0.84 |
| 19 | 2.0 | 15 | 3.3 | 300 | 138 | 91 | 0.92 |

[1] By weight based on the weight of original copolymer.

After the polymers obtained in Comparative Example 17 and in Examples 17, 18 and 19 were treated with xylene and methylethyl ketone according to the similar procedures as described in Examples 1-5, the amount of monomer linked to the crystalline propylene copolymer was determined. As a result, no styrene linked to the propylene polymer was observed in the polymer obtained in Comparative Example 17, whereas the presence of 1.8%, 4.2% and 6.1% of styrene linked to the propylene copolymer were observed in the modified polymers obtained in Examples 17, 18 and 19, respectively.

Upon comparing the results obtained in examples with those of comparative examples given in Table 5, it is readily noted that according to the modifying process of this invention the impact strength of the modified polymers are very remarkably improved along with the improvements in the tensile modulus and hardness. Thus, in accordance with the process of this invention, there can be obtained a polymer having well-balanced properties in terms of the tensile modulus and impact strength.

EXAMPLES 20-21

To a powdered 4-methylpentene-1 polymer having an intrinsic viscosity of 3.4 and 93% of a portion insoluble in boiling n-heptane were incorporated various amounts of dibutyl-tin-oxide and octyl methacrylate as specified in the following Table 6 and the resulting mixtures were kneaded in a molten state at 295° C. by using a 20 m./m. diameter screw extruder-type pelletizing device and there were obtained modified polymers of which physical properties were measured.

For comparison, polymers containing neither modifier nor catalyst, and containing di-butyl-tin-oxide or octyl methacrylate, respectively alone, were extruded under the same conditions, and the physical properties of these polymers were also measured. The results are summarized in the following Table 6:

TABLE 6

| | Amounts of catalyst and modifier used [1] (percent) | | Mechanical properties | | | | |
|---|---|---|---|---|---|---|---|
| | Dibutyl-tin-oxide | Octyl meth-acrylate | Melt index 275° C. 2.16 kg. | Tensile yield strength | Rockwell hardness | Izod impact strength | Heat distortion temperature, 66 p.s.i. |
| Comparative Example No.: | | | | | | | |
| 18 | | | 1.0 | 160 | 88 | 0.59 | 59 |
| 19 | 0.5 | | 7.1 | 165 | 89 | 0.57 | 61 |
| 20 | | 5 | 2.6 | 140 | 82 | 0.62 | 65 |
| Example No.: | | | | | | | |
| 20 | 0.5 | 5 | 3.1 | 158 | 83 | 0.87 | 78 |
| 21 | 0.5 | 8 | 2.2 | 151 | 82 | 1.23 | 83 |

[1] By weight based on the weight of mono-olefin polymer.

After the polymers obtained in Comparative Example 20 and in Examples 20 and 21 were treated with tetraline and acetone according to the similar procedures as in Examples 1–5, the amount of octyl methacrylate linked to the crystalline 4-methylpentene-1 polymer was determined.

As a result, no octyl methacrylate linked to the 4-methylpentene-1 polymer was detectable in the polymer obtained in Comparative Examaple 20, whereas in the polymers obtained in Examples 20 and 21, it was observed that 2.3% and 4.2% of octyl methacrylate were linked, respectively. As can be clearly noted by the comparison of Examples 20 and 21 with comparative examples shown in Table 6, the impact strength of the modified polymers are outstandingly improved. Moreover, an attention should be drawn to the fact that the low heat distortion temperature of poly-4-methylpentene-1 which is regarded as a drawback has been lifted up by 20° C. according to the modifying process of this invention.

EXAMPLE 22

To a powdered propylene polymer having an intrinsic viscosity of 14.2 and 98% of a portion insoluble in boiling n-heptane were incorporated 0.5% by weight of di-tert-butyltin oxide and 5.0% by weight of sodium acrylate based on the weight of the propylene polymer and the resulting mixture was kneaded for 10 minutes in a molten state at 250° C. under nitrogen atmosphere by using a Banbury mixer.

Then, unreacted sodium acrylate was removed from the resulting modified polymer.

For comparison, polymer containing di-tert-butyltin oxide or sodium acrylate, respectively alone, were prepared under the same conditions.

The crystallization temperature of these polymers were measured by a differential scanning calorimeter, and the results obtained are shown along with the values of heat distortion temperatures in the following Table 7:

TABLE 7

| | Amounts of catalyst and modifier used [1] (percent) | | Heat distortion temperature (° C.) | Crystallization temperature (° C.) |
|---|---|---|---|---|
| | Di-tert-butyl-tin-oxide | Sodium acrylate | | |
| Comparative example No.: | | | | |
| 21 | 0.5 | | 105 | 112 |
| 22 | | 5.0 | 105 | 113 |
| Example No. 22 | 0.5 | 5.0 | 121 | 119 |

[1] By weight based on the weight of propylene polymer.

It can be noted from the above that the heat distortion temperature of the modified polymer obtained in Example 22 is higher by 16° C. as compared with those of polymers obtained in Comparative Examples 21 and 22.

In addition, a remarkable improvement in the transparency was observed in the modified polymer.

EXAMPLE 23

To the same powdered propylene polymer as used in Example 22 were incorporated 0.2% by weight of dibenzyl-tin-oxide and 3.0% by weight of methacrylic acid based on the weight of the propylene polymer and the resulting mixture was kneaded in a molten state at 250° C. by using a 20 m./m. diameter screw extruder-type pelletizing device and there was obtained a modified polymer. The resulting polymer was formed by melt spinning into filaments.

The filaments thus obtained were dyed with a basic dyestuff in a deep color.

What is claimed is:

1. A process for modifying a homopolymer of a mono-olefin selected from the group consisting of ethylene, propylene, butene-1,3-methylbutene-1,4-methylpentene - 1 or styrene; a copolymer or block polymer of the aforesaid mono-olefin with monomers recited infra; or mixtures of two or more compounds of the previously recited mono-olefin polymers which comprises reacting the mono-olefin polymer with a monomer selected from the group consisting of styrene, acrylic, methacrylic acids, esters and amides; vinyl esters and allyl esters; polycyclic and heterocyclic vinyl compounds; divinylbenzenes, ethylene dimethacrylate, diethylene dimethyl acrylate, polyethylene dimethacrylate, divinyladipate, diallyl maleate, diallyl phthalate, allyl acrylate, triallyl phosphite, diallyl cyanurate and triallyl cyanurate at a temperature of from 200 to 350° C. in the presence of a tetravalent organotin compound represented by the following formulae:

$[R]_1Sn[OOCR']_m$ and $R'COO[Sn(R)_2O]_nOCR'$

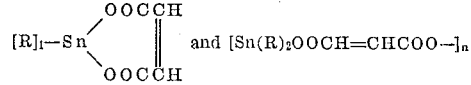
and $[Sn(R)_2OOCH=CHCOO-]_n$ $[R]_2SnO$ and $[-Sn(R)_2O-]_n$
$[R]_1Sn[OOC \cdot CH=CHCOOR']_m$
$[R]_1Sn[OR']_m$ and $R'O[Sn(R)_2O-]_nR'$
$R'O[Sn(R)_2O]_nOCR'$
$R'O[Sn(R)_2O]_nOC \cdot CH=CHCOOR'$
$R[Sn(R)_2O]_nSn[R]_3$
$[R'O]_1Sn[R]_m[OOCR']_s$
$[R]_3SnOH$
$[R'O]_1Sn[R]_m[SR']_s$
$[R]_2SnS$ and $[-Sn(R)_2S-]_n$
$[R]_1Sn[SR]_m$
and
$[R]_1Sn[X]_m$ wherein R which may be the same or different represents a member selected from the group consisting of alkyl, allyl, aryl, benzyl and cyclohexyl groups; R' which may be the same or different represents a member selected from the group consisting of alkyl, aryl and cycloalkyl groups which may contain substituent, X represents halogen; $l$ and $m$ represent integers of 1, 2 or 3; $s$ represents integers of 0, 1 or 2; $l+m+s$ makes 4; and $n$ represents a degree of polymerization, said monomer and organotin compound being present in an amount of from 0.1 to 50% by weight and 0.01 to 10% by weight based upon the weight of the mono-olefin polymer respectively.

References Cited

UNITED STATES PATENTS

| 2,872,439 | 2/1959 | Gresham et al. | 260—94.9 |
| 3,318,976 | 5/1967 | Short | 260—878 |
| 3,347,955 | 10/1967 | Renaudo | 260—878 |

FOREIGN PATENTS

| 371,285 | 3/1961 | Japan. |
| 542,927 | 5/1956 | Italy. |

JOSEPH L. SCHOFER, Primary Examiner

S. M. LEVIN, Assistant Examiner

U.S. Cl. X.R.

260—878 R, 883, 885, 886